US012655060B2

(12) United States Patent
Eccleston

(10) Patent No.: US 12,655,060 B2
(45) Date of Patent: Jun. 16, 2026

(54) SYSTEM AND PROCESS FOR OXY-FUEL CALCINATION OF LIME-BEARING SLUDGE

(71) Applicant: T.EN Process Technology, Inc., Houston, TX (US)

(72) Inventor: Eric Eccleston, Claremont, CA (US)

(73) Assignee: T.EN Process Technology, Inc., Houston, TX (US)

( * ) Notice: Subject to any disclaimer, the term of this patent is extended or adjusted under 35 U.S.C. 154(b) by 616 days.

(21) Appl. No.: 18/062,065

(22) Filed: Dec. 6, 2022

(65) Prior Publication Data

US 2024/0182361 A1 Jun. 6, 2024

(51) Int. Cl.
*C04B 2/10* (2006.01)

(52) U.S. Cl.
CPC .............. *C04B 2/104* (2013.01); *C04B 2/108* (2013.01)

(58) Field of Classification Search
CPC ........... C04B 2/104; C04B 2/108; C04B 2/12; C04B 2/10
USPC .......................................... 422/613; 106/792
See application file for complete search history.

(56) References Cited

U.S. PATENT DOCUMENTS

| | | | |
|---|---|---|---|
| 2,465,410 A | 3/1949 | White | |
| 2,650,084 A | 8/1953 | White | |
| 2,738,182 A | 3/1956 | Thompson | |
| 5,354,375 A * | 10/1994 | Cohen | C04B 2/12 |
| | | | 106/793 |

FOREIGN PATENT DOCUMENTS

WO    WO-2016087390 A1 *  6/2016  ............. C04B 7/434

* cited by examiner

*Primary Examiner* — Prem C Singh
(74) *Attorney, Agent, or Firm* — Kilpatrick Townsend & Stockton LLP

(57) ABSTRACT
The disclosure generally provides a modification of a calcination process of lime bearing sludge in such a way that the flue gas generated by the calcination process contains primarily carbon dioxide and water vapor along with only minor amounts of other gaseous species. Such a flue gas can be treated by standard industrial gas scrubbing and purification processes to remove residual particulate solids, to condense and remove the water vapor as liquid water, and further treatment to produce essentially pure carbon dioxide. The resulting product may be used for purposes that do not involve a net emission of carbon dioxide to the atmosphere, thereby reducing environmental harm. Such purified carbon dioxide may be used in industry for enhanced oil recovery (EOR) processes, synthetic fuels production, carbonated beverage production, pharmaceutical production, or other beneficial uses.

20 Claims, 1 Drawing Sheet

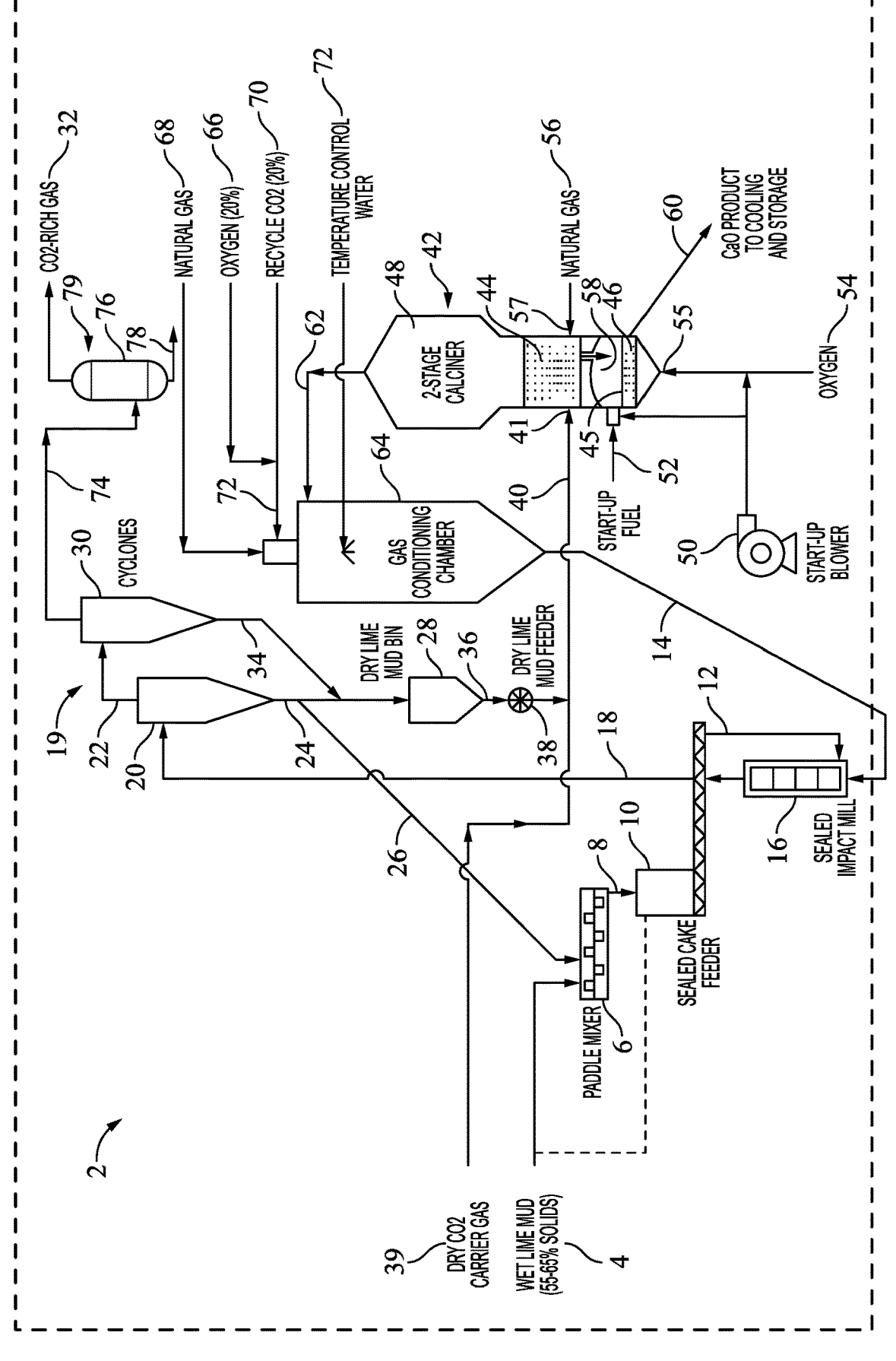

SYSTEM AND PROCESS FOR OXY-FUEL CALCINATION OF LIME-BEARING SLUDGE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure relates generally to calcination of sludge. More particularly, the disclosure relates to calcination of lime-bearing sludges.

Description of the Related Art

In this context, calcination refers to decomposition of calcium carbonate to calcium oxide and carbon dioxide. This calcination reaction can be represented by the chemical equation $CaCO_3(solid) \rightarrow CaO(solid)+CO_2(gas)$. Calcium oxide (CaO), also known as quicklime or unslaked lime, has many important uses in modern society. Important industrial uses of calcium oxide include use as an ingredient in cement making, as a chemical flux in the production of metals, and as a reagent for regeneration of alkali hydroxide chemicals such as caustic soda (NaOH) or potash (KOH) from solutions containing alkali carbonates. Industrial calcination of calcium carbonate generally emits large quantities carbon dioxide (CO2) gas both from the calcination reaction and from burning fossil fuels to provide heat for the process. Lime-bearing sludges of calcium carbonate can be produced by causticizing processes in the pulp and paper industry, water softening processes, sugar production, and by regeneration of alkali-based reagents used for carbon dioxide absorption applied to the capture of carbon dioxide from flue gases or directly from atmospheric air. Such sludges generally contain lime in the form of finely divided calcium carbonate (CaCO3) along with minor amounts of calcium oxide in hydrated form (CaO(OH)), and other impurities. In the pulp and paper industry, these lime-bearing sludges are generally calcined to regenerate anhydrous lime (CaO) using a rotary kiln or fluidized bed calciner with heat supplied by the combustion of fossil fuels with air. In recent years, as the size of pulp and paper plants has grown, rotary kilns are generally favored due to the large capacity that can be processed in a single unit.

A major disadvantage of the calcination process using heat from fossil fuel combustion with air is that the resulting flue gas contains carbon dioxide, released not only by the calcination process, but also by combustion of the fossil fuel. The resulting flue gas is diluted with excess nitrogen and oxygen from the air used for combustion. This is particularly problematic if the lime-bearing sludge contains calcium carbonate formed by the absorption of carbon dioxide from an industrial flue gas or by capture from atmospheric air. It is difficult to re-use, sequester, or otherwise remove carbon dioxide from these diluted gas streams. Furthermore, release of the flue gas from the calcination process would defeat the purpose of the dioxide capture process from which the calcium carbonate was generated. Therefore, there is a need for an improved calcination system and process.

BRIEF SUMMARY OF THE INVENTION

The disclosure generally provides a modification of a calcination process of lime bearing sludge in such a way that the flue gas generated by the calcination process contains primarily carbon dioxide and water vapor along with only minor amounts of other gaseous species. Such a flue gas can be treated by standard industrial gas scrubbing and purification processes to remove residual particulate solids, to condense and remove the water vapor as liquid water, and further treatment for removal of gaseous impurities to produce essentially pure carbon dioxide. The resulting product may be used for purposes that do not involve a net emission of carbon dioxide to the atmosphere, thereby reducing environmental harm. Such purified carbon dioxide may be used in industry for enhanced oil recovery (EOR) processes, synthetic fuels production, carbonated beverage production, pharmaceutical production, or other beneficial uses.

In at least one embodiment, the calcination system for lime-bearing sludge includes: an impact mill configured to receive the lime-bearing sludge and simultaneously disperse the lime-bearing sludge into discrete lime-bearing sludge particles for mixing and drying with heated exhaust gas from a fluidized bed calciner; a cyclone (or series of cyclones) coupled to the mill and configured to receive the dried lime-bearing sludge solids and the calciner exhaust gas and to separate the majority of the dried lime-bearing sludge solids from the calciner exhaust gas with the calciner exhaust gas, largely free of solids, forming a gas having primarily carbon dioxide and water vapor as a product; a lime mud receiving vessel and feeder coupled to the cyclone and configured to receive the dried lime-bearing sludge solids from the cyclone(s); a fluidized bed calciner coupled to the lime mud feeder, and configured to receive the lime-bearing sludge solids from the lime mud feeder and to calcine the solids in a chamber wherein combustion of hydrocarbon fuel with substantially pure oxygen takes place; and a gas conditioning chamber wherein hot calciner exhaust gas is either cooled or heated to satisfy the thermal requirements for drying of the incoming lime-bearing sludge in the impact mill. Further, the system can include a wet scrubber downstream of the cyclones to scrub an amount of the remaining powder and water vapor from the gas having primarily carbon dioxide and water vapor.

More generally, the disclosure provides a calcination system for lime-bearing sludge, comprising: a mixer configured to mix the lime-bearing sludge with a relatively drier lime-bearing sludge to produce a mixed lime-bearing sludge; an impact mill dryer coupled to the mixer and configured to receive the mixed lime-bearing sludge and disperse the mixed lime-bearing sludge into dried lime-bearing sludge solids for mixing with a transportation gas; a cyclone coupled to the mill and configured to receive the dried lime-bearing sludge solids and the transportation gas to at least partially separate the dried lime-bearing sludge solids from the transportation gas and form a gas of primarily carbon dioxide as a product; a lime mud feeder coupled to the cyclone and configured to receive the dried lime-bearing sludge solids from the cyclone; and a calciner coupled to the lime mud feeder, and configured to receive the dried lime-bearing sludge solids from the lime mud feeder to calcine the solids in a chamber receiving gas containing a percentage of oxygen greater than atmospheric air, the calciner being at least partially sealed from atmospheric air and having a hydrocarbon fuel supply coupled to the calciner.

The disclosure also provides a calcination system for lime-bearing sludge, comprising: a calciner at least partially sealed from atmospheric air intrusion; a lime-bearing sludge supply coupled to the calciner; an oxygen supply having a majority percentage of oxygen coupled to the calciner; and a hydrocarbon fuel supply coupled to the calciner. The system can further include a scrubbing system coupled to the cyclones to further treat the calciner exhaust gas to remove residual particulate solids and to condense a majority of the water vapor contained in the gas stream.

The disclosure further provides a calcination system for lime-bearing sludge, comprising: an impact mill dryer configured to receive the lime-bearing sludge and disperse the lime-bearing sludge into dried lime-bearing sludge solids for mixing with a transportation gas; a cyclone coupled to the mill and configured to receive the dried lime-bearing sludge solids and the transportation gas to at least partially separate the dried lime-bearing sludge solids from the transportation gas and form a gas of primarily carbon dioxide as a product; a lime mud feeder coupled to the cyclone and configured to receive the dried lime-bearing sludge solids from the cyclone; and a calciner coupled to the lime mud feeder, and configured to receive the dried lime-bearing sludge solids from the lime mud feeder to calcine the solids in a chamber receiving gas containing a percentage of oxygen greater than atmospheric air, the calciner being at least partially sealed from atmospheric air and having a hydrocarbon fuel supply coupled to the calciner.

BRIEF DESCRIPTION OF THE SEVERAL VIEWS OF THE DRAWINGS

The FIGURE provides a schematic flow diagram of the inventive system and process.

DETAILED DESCRIPTION

The FIGURE described above and the written description of specific structures and functions below are not presented to limit the scope of what Applicant has invented or the scope of the appended claims. Rather, the FIGURE and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a controller would encompass a processor and a system of related components that are known to those with ordinary skill in the art and may not be specifically described. Various examples are provided in the description and FIGURE that perform various functions and are non-limiting in shape, size, description, but serve as illustrative structures that can be varied as would be known to one with ordinary skill in the art given the teachings contained herein. Unless stated otherwise, percentages herein are in weight percent.

The disclosure generally provides a modification of a calcination process of lime bearing sludge in such a way that the flue gas generated by the calcination process contains primarily carbon dioxide and water vapor along with only minor amounts of other gaseous species. Such a flue gas can be treated by standard industrial gas scrubbing and purification processes to remove residual particulate solids, to condense and remove the water vapor as liquid water, and further treatment to produce essentially pure carbon dioxide. The resulting product may be used for purposes that do not involve a net emission of carbon dioxide to the atmosphere, thereby reducing environmental harm. Such purified carbon dioxide may be used in industry for enhanced oil recovery (EOR) processes, synthetic fuels production, carbonated beverage production, pharmaceutical production, or other beneficial uses.

In more detail, lime-bearing sludge, also known in the industry as "lime mud" or "lime sludge", is composed primarily of finely divided calcium carbonate ($CaCO_3$) in the form of a sludge that has been dewatered generally to about 50% to 65% solids by means of centrifuges or a rotary vacuum filter prior to the present described process, although such dewatering could be included. The disclosure provides an integrated system to dry and calcine the finely-divided lime-bearing solids in the form of a sludge or slurry to produce a lime product that is generally nodulized or pelletized. The calcination generally takes place in a fluidized bed calciner using high purity oxygen, instead of the typical air, as the fluidizing gas for combustion of fuel injected into the bed of fluidized solids contained in the calciner.

In typical calcination process for lime-bearing sludges, fluidized bed calciners are fluidized with air for combustion. The present invention departs from the conventional practice by using high purity oxygen instead of air. While the standard practice would teach away from the expense of oxygen instead of air at no cost, the use of oxygen as the fluidizing gas provides a number of advantages realized by this invention. First, the thermal efficiency of the process in the calciner is generally improved by about 20 to 25%. The amount of fuel required to provide heat for calcination of a given amount of solids is less, because diluting inert nitrogen that is carried along with the typical fluidizing and combustion air is not present in the high purity oxygen to consume any heat energy in raising the temperature of oxygen. Energy requirements in prior systems using air combustion would be in the range of 90,000 Btu/ton of product for fuel consumption. In contrast, energy requirements of the present invention using high purity oxygen combustion have been determined to be about 70,000 Btu/ ton of product.

Second, due to the lack of diluting nitrogen in the fluidizing gas and the very low or zero requirement for excess oxygen, the exhaust gas of the calciner contains primarily carbon dioxide and water vapor. The exhaust gas, after scrubbing and condensation of the water, can be readily and efficiently converted by known methods into a high-concentration carbon dioxide stream suitable for industrial or commercial uses, such as enhanced oil recovery (EOR) processes, synthetic fuels production, carbonated beverage production, pharmaceutical production, and other applications.

Third, the combustion process using high purity oxygen instead of air at typical lime calcining temperatures between about 900° C. to 1050° C. results in less excess oxygen for complete combustion of the fuel. As a result, the calciner exhaust gas may contain less oxygen as a contaminant in the $CO_2$ gas that may need removal by gas purification processes, depending on the final use of the carbon dioxide gas produced from calcination. In some embodiments, when using oxygen as the fluidizing and combustion gas, combustion under zero excess oxygen conditions or at conditions slightly below stoichiometric oxygen requirements may be advantageous. Operating at stoichiometric or slightly below stoichiometric oxygen can limit the oxygen in the product $CO_2$ gas. The limit on oxygen is important where purity is a major concern and where costly gas treatment is needed to remove oxygen in the $CO_2$ product gas, depending on the specifications and ultimate use of the product gas.

One challenge of the improved calcination system and process results from the calciner combustion with pure oxygen instead of air for more efficiency. Depending on the properties of the fine calcium carbonate and the aqueous process solution forming lime-bearing sludge, along with the capabilities of typical mechanical dewatering processes, the lime-bearing sludge feed to the calcination system may contain varying amounts of moisture. Typical lime-bearing sludge feed will be in a form containing approximately 50% to 65% solids. The calcining exhaust gas may have insufficient energy to completely dry the incoming lime mud. To overcome this possible thermal deficit, a gas conditioning chamber with a burner is incorporated into the system to add additional heat to the calciner exhaust gas. To prevent this gas conditioning chamber from introducing additional nitrogen, the burner also does not use air for combustion. However, a burner using only oxygen will have excessively high flame temperature and require special materials of construction. To overcome that challenge, the process provides a further modification by uniquely providing a combustion chamber with a burner that uses a mixture of oxygen and $CO_2$, such as recycled $CO_2$, instead of air or pure oxygen to combust the fuel. The recycled $CO_2$, depending on the percentage, can also serve to cool the combustion process to an acceptable level. The gas conditioning chamber is also equipped with water sprays to cool the gas to acceptable levels compatible with an impact mill dryer materials of construction.

The FIGURE provides a schematic flow diagram of the inventive system and process and is detailed below. Lime-bearing sludge 4 having about 50% to 65% solids as feedstock can be supplied into a mixer 6 along with recycled dry lime mud 26, which may be a portion of the dry lime mud collected by the primary cyclone 20 that is relatively drier than such feedstock, resulting in a substantially homogeneous mixed lime-bearing sludge 8 that generally contains about 70% to 90% solids. Alternatively, depending on the material handling properties of the lime-bearing sludge, the sludge may be directly fed to an impact mill dryer 16 without need for recycled dry lime mud 26.

The mixed lime-bearing sludge 8 (or lime-bearing sludge 4, if no recycle dried lime mud is required) flows into a sealed feeder 10 that is at least partially sealed from air intrusion. The term "sealed" is intended to mean that the relevant component is restricted from an intrusion of air that would substantially affect the purity of the resulting $CO_2$ product stream compared to a typical $CO_2$ stream from a calciner using air in the calcining process. The term "air" is intended to mean air of the atmosphere composed of many elemental gases such as nitrogen, oxygen, argon, carbon dioxide, and other gases in trace amounts. Generally, atmospheric air contains about 79 percent nitrogen and about 21 percent oxygen and therefore oxygen constitutes a minority fraction of the composition of air. The term "oxygen" as used in the processing described herein is intended to mean a gaseous composition having a percentage of oxygen substantially greater than atmospheric air. The oxygen composition can be a majority percentage of greater than 50 percent, at least 80 percent, advantageously at least 95 percent, or more advantageously at least 99 percent. The feeder 10 receives the mixed lime-bearing sludge 8 (or lime-bearing sludge 4 directly, if no recycled dry lime mud is employed) to control a feed rate of the feed material 12 into an impact mill dryer 16. The impact mill dryer 16 may take the form of a rotating cage mill, hammer mill, or other type of rotating impact mill. The impact mill dryer can also be at least partially sealed from air intrusion. The impact mill dryer 16 disperses and mixes the feed material 12 with hot conditioned exhaust gas 14 from a gas conditioning chamber (described below) allowing for efficient evaporation moisture contained in the dispersed solids from the mixed lime-bearing sludge 8 (or lime-bearing sludge 4). The dispersed solids are simultaneously dried and broken up into a powder by the action of the impact mill dryer 16.

The conditioned exhaust gas 14 passing through the impact mill dryer 16 entrains, dries, and transports the dried lime-bearing sludge solids in the form of a powder in a powder/gas combined stream 18 into a two-stage cyclone collection system 19. A primary cyclone 20 separates a majority of the lime-bearing sludge solids powder from the combined stream 18 and a resulting dried lime-bearing sludge solids powder stream 24 flows into a dry lime mud bin 28. A diverted stream from the dry lime mud 26, as a portion of the powder stream 24 collected by the primary cyclone, may be recycled to the mixer 6 to produce a drier mixture with higher solids content when combined with the incoming lime-bearing sludge 4, described above. The remaining powder/gas combined stream 22 from the primary cyclone 20 flows into a secondary cyclone 30. The secondary cyclone 30 further separates the powder in the combined stream 22 and the separated powder 34 collected by the secondary cyclone 30 is also discharged into the dry lime mud bin 28. The exhaust gas stream 74 from the secondary cyclone 30 can pass through a wet scrubber 76. Any residual fine powder that is not collected by the secondary cyclone can be captured by the wet scrubber. In addition to removal of residual fine powder, the wet scrubber 76 cools the gas stream 74 by direct contact with water 79 and can remove and recover a large portion of the water vapor in the exhaust gas stream 74 by condensation into liquid water 78. The gas exhaust stream of the scrubber is a CO2-rich gas stream 32 having a majority percentage of CO2 that is greater than 50% (measured on a dry or moisture-free basis), at least 80 percent, advantageously at least 90 percent, or more advantageously at least 98 percent.

The dry lime mud feeder 38 meters dried lime-bearing sludge solids powder 36 from the dry lime mud bin 28 into a dry CO2 carrier gas stream 39 for pneumatic conveyance as a combined powder/CO2 stream 40. The dry lime mud feeder 28 may include a rotary valve type feeder or other metering device. The combined stream 40 having the dried lime-bearing sludge solids powder 36 can be introduced through openings 41 into a lime mud calciner 42, such as a two-stage fluidized bed reactor, having a calcining compartment 44 and a cooling compartment 46. The calciner 42 is at least partially sealed from air intrusion. An example of such a fluidized bed reactor is the Dorr-Oliver FluoSolids® type of calciner. A start-up blower 50 and a start-up fuel source 52 can assist an initial start-up of the calciner 42. In at least one embodiment, the combined stream 40 can be introduced into a lower portion of the calcining compartment 44 via multiple feed pipes. The space above a calcining bed in the calcining compartment 44 is called the freeboard 48. The freeboard 48 can be expanded in diameter compared to the diameter of a calcining bed in the calcining compartment 44. The expanded diameter decreases an upward velocity of exhaust gases and allows entrained solids to fall back into the bed.

At about 900° C., the fine calcium carbonate particles of the dried lime-bearing sludge solids powder 36 fed into the calcining compartment 44 decompose to calcium oxide (CaO) that is generally designated as "lime" to form a lime product 45. Small amounts of inert material contained in the calcined product can form soft, glassy phases at the calcining temperatures and cause the fine lime particles to adhere to each other and agglomerate into "pellets" or nodules. The size and shape of the pellets or nodules can be controlled to a degree by crushing a portion of the lime product 45 and re-feeding the crushed product to the calcining compartment 44 as "seed" particles. Additionally, adjustment of the calcining compartment 44 temperature may also control the pellet or nodule size and shape. The temperature of the calcining compartment 44 can be controlled by adjusting the rate of injection of combustion natural gas or other hydrocarbon fuel 56 through an opening 57.

The lime product 45, in the form of pellets that can range in size from 0.2 mm to 5 mm, can be discharged from the calcining compartment 44 through an internal transfer conduit 58. The lime product 45 can be discharged into a fluidized bed of the cooling compartment 46, where the lime product is cooled and incoming fluidizing oxygen 54 through an opening 55 flowing through the cooling compartment 46 to the calcining compartment 44 is preheated. When the lime product 60 is discharged from the cooling compartment 46, it can be transported to a lime storage bin via a bucket elevator (not shown). A portion of the lime product 45 may crushed and recycled to the calcining compartment 44 for use as seed particles for the formation of pellets and to control particle size of the lime product as pellets.

As described above, the use of oxygen as the fluidizing gas, instead of air, provides a number of advantages realized by this invention. First, the thermal efficiency of the process in the calciner is generally improved by about 20 to 25%, because little to no heat is required to raise the temperature of diluting inert nitrogen that is carried along with the fluidizing and combustion air. Second, the lack of nitrogen in the fluidizing gas and the very low or zero requirement for excess oxygen results in the exhaust gas of the calciner containing primarily CO2 and water vapor. The exhaust gas, after scrubbing and condensation of the water, can be readily converted into a high-concentration CO2 stream. Third, the combustion process using oxygen instead of air results in less excess oxygen for complete combustion and less oxygen as a contaminant in the CO2 gas. In some embodiments, when using oxygen as the fluidizing and combustion gas, combustion at or slightly below stoichiometric oxygen levels is advantageous to limit the oxygen in the product CO2 gas.

Due to the lesser mass flow of gas with the oxygen feed into the calciner 42, as compared to calciner using air for combustion, the calciner exhaust gas 62 may not contain sufficient energy to effectively evaporate the moisture contained in the feed material 12 that is dried and broken up by the impact mill 16 as feed for the calciner 42. Therefore, the hot calciner exhaust gas 62 from the calciner 42 passes through a gas conditioning combustion chamber 64 where additional hydrocarbon fuel 68 is combusted with oxygen 66 to further heat the calciner exhaust gas 62. The gas conditioning combustion chamber 64 is at least partially sealed from air intrusion. Dilution of the oxygen with CO2 70 is used to maintain temperatures low enough to prevent fusion or sintering of the particles contained in the calciner exhaust gas 62 and to allow for construction of the chamber 64 with standard materials of construction. In at least one embodiment, a mixture of about 20% oxygen and 80% CO2 can be suitable, but the percentages can change depending on the incoming amount of heat of the calciner exhaust gas 62 and the desired amount of heat of the hot conditioned exhaust gas 14 for drying in the impact mill 16. Advantageously and uniquely, the CO2 that is used to cool the chamber 64 can be recycled CO2 from the processing described herein. Temperature control water 72 may also be injected into the chamber 64 to allow additional temperature control by evaporation.

Other and further embodiments utilizing one or more aspects of the inventions described above can be devised without departing from the disclosed invention as defined in the claims. For example, other embodiments can include various calciners, mixers, and feeders, and other equipment, various compositions of lime mud, percentages of mixtures and combinations, and other variations than those specifically disclosed above within the scope of the claims.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. A calcination system for lime-bearing sludge, comprising:
   a mixer arranged to mix the lime-bearing sludge with a relatively drier lime-bearing sludge to produce a mixed lime-bearing sludge;
   an impact mill dryer coupled to the mixer to receive the mixed lime-bearing sludge and disperse the mixed lime-bearing sludge into dried lime-bearing sludge solids for mixing with a transportation gas;
   a cyclone coupled to the mill to receive the dried lime-bearing sludge solids and the transportation gas to at least partially separate the dried lime-bearing sludge solids from the transportation gas and form a gas of primarily carbon dioxide as a product;
   a lime mud feeder coupled to the cyclone to receive the dried lime-bearing sludge solids from the cyclone;
   a calciner coupled to the lime mud feeder to receive the dried lime-bearing sludge solids from the lime mud feeder to calcinate in a chamber containing a percentage of oxygen greater than atmospheric air, the calciner being at least partially sealed from atmospheric air and having a hydrocarbon fuel supply coupled to the calciner;
   a gas conditioning chamber sealed from air intrusion and arranged to receive calciner exhaust gas from the calciner and add heat to the calciner exhaust gas;
   an oxygen supply having a majority percentage of oxygen coupled to a burner of the gas conditioning chamber;
   a carbon dioxide supply having a majority percentage of carbon dioxide coupled to the burner of the gas conditioning chamber;
   a hydrocarbon fuel supply coupled to the burner of the gas conditioning chamber; and
   at least one water spray to inject water into the gas conditioning chamber to cool the calciner exhaust gas via evaporation;
   wherein the calciner exhaust gas in the gas conditioning chamber is maintainable below a threshold temperature at which particles contained in the calciner exhaust gas experience fusion or sintering by adjusting a ratio of oxygen from the oxygen supply to carbon dioxide from the carbon dioxide supply.

2. The calcination system of claim 1, wherein a conditioned exhaust gas stream from the gas conditioning chamber is mixable with a lime-bearing sludge for processing.

3. The calcination system of claim 1, further comprising a sealed feeder interposed between the mixer and the impact mill dryer to receive the mixed lime-bearing sludge from the mixer and to control a feed rate of the mixed lime-bearing sludge into the impact mill dryer.

4. The calcination system of claim 1, wherein the carbon dioxide supply comprises recycled carbon dioxide from a carbon dioxide stream produced from the calcination system.

5. The calcination system of claim 1, wherein the transportation gas is formed from a conditioned exhaust gas stream from the gas conditioning chamber.

6. The calcination system of claim 1, wherein the impact mill dryer is at least partially sealed from air intrusion.

7. The calcination system of claim 1, further comprising a wet scrubber coupled downstream of the cyclone to scrub an amount of remaining solids and water vapor from the gas of primarily carbon dioxide.

8. A calcination system for lime-bearing sludge, comprising:
   a calciner at least partially sealed from atmospheric air intrusion;
   a lime-bearing sludge supply coupled to the calciner;
   an oxygen supply having a percentage of oxygen greater than atmospheric air coupled to the calciner;
   a hydrocarbon fuel supply coupled to the calciner;
   a gas conditioning chamber sealed from air intrusion and arranged to receive calciner exhaust gas from the calciner and add heat to the calciner exhaust gas;
   an oxygen supply having a majority percentage of oxygen coupled to a burner of the gas conditioning chamber;
   a carbon dioxide supply having a majority percentage of carbon dioxide coupled to the burner of the gas conditioning chamber; and
   a hydrocarbon fuel supply coupled to the burner of the gas conditioning chamber; and
   at least one water spray to inject water into the gas conditioning chamber to cool the calciner exhaust gas via evaporation;
   wherein the calciner exhaust gas in the gas conditioning chamber is maintainable below a threshold temperature at which particles contained in the calciner exhaust gas experience fusion or sintering by adjusting a ratio of oxygen from the oxygen supply to carbon dioxide from the carbon dioxide supply.

9. The calcination system of claim 8, further comprising a wet scrubber arranged downstream of the cyclone collection system to scrub an amount of remaining solids and water vapor from a gas of primarily carbon dioxide formed as a product by the cyclone collection system.

10. The calcination system of claim 8, wherein a hydrocarbon fuel supply is coupled to the calciner and the calciner includes a chamber containing a percentage of oxygen greater than atmospheric air to calcinate lime-bearing sludge received from the lime-bearing sludge supply.

11. The calcination system of claim 8, wherein the carbon dioxide supply comprises recycled carbon dioxide from a carbon dioxide stream produced from the calcination system.

12. The calcination system of claim 8, wherein a conditioned exhaust gas stream from the gas conditioning chamber is mixable with a lime-bearing sludge for processing.

13. The calcination system of claim 8, further comprising a mill at least partially sealed from air intrusion to receive lime-bearing sludge and mix the lime-bearing sludge with a conditioned exhaust gas stream from the gas conditioning chamber.

14. The calcination system of claim 8, further comprising a cyclone collection system to receive lime-bearing sludge components mixed with a conditioned exhaust gas stream from the gas conditioning chamber and separate the components and the exhaust gas.

15. The calcination system of claim 14, wherein an exhaust gas that is separated in the cyclone collection system comprises primarily a carbon dioxide stream.

16. A calcination system for lime-bearing sludge, comprising:

an impact mill dryer arranged to receive the lime-bearing sludge and disperse the lime-bearing sludge into dried lime-bearing sludge solids for mixing with a transportation gas;

a cyclone coupled to the mill to receive the dried lime-bearing sludge solids and the transportation gas to at least partially separate the dried lime-bearing sludge solids from the transportation gas and form a gas of primarily carbon dioxide as a product;

a lime mud feeder coupled to the cyclone to receive the dried lime-bearing sludge solids from the cyclone;

a calciner coupled to the lime mud feeder to receive the dried lime-bearing sludge solids from the lime mud feeder to calcinate in a chamber containing a percentage of oxygen greater than atmospheric air, the calciner being at least partially sealed from atmospheric air and having a hydrocarbon fuel supply coupled to the calciner;

a gas conditioning chamber sealed from air intrusion and arranged to receive calciner exhaust gas from the calciner and add heat to the calciner exhaust gas;

an oxygen supply having a majority percentage of oxygen coupled to a burner of the gas conditioning chamber;

a carbon dioxide supply having a majority percentage of carbon dioxide coupled to the burner of the gas conditioning chamber;

a hydrocarbon fuel supply coupled to the burner of the gas conditioning chamber; and at least one water spray to inject water into the gas conditioning chamber to cool the calciner exhaust gas via evaporation;

wherein the calciner exhaust gas in the gas conditioning chamber is maintainable below a threshold temperature at which particles contained in the calciner exhaust gas experience fusion or sintering by adjusting a ratio of oxygen from the oxygen supply to carbon dioxide from the carbon dioxide supply.

17. The calcination system of claim 16, further comprising a wet scrubber coupled downstream of the cyclone to scrub an amount of remaining solids and water vapor from the gas of primarily carbon dioxide.

18. The calcination system of claim 16, wherein the carbon dioxide supply comprises recycled carbon dioxide from a carbon dioxide stream produced from the calcination system.

19. The calcination system of claim 16, wherein the transportation gas is formed from a conditioned exhaust gas stream from the gas conditioning chamber.

20. The calcination system of claim 16, wherein the impact mill dryer is at least partially sealed from air intrusion.

* * * * *